United States Patent Office 3,553,082
Patented Jan. 5, 1971

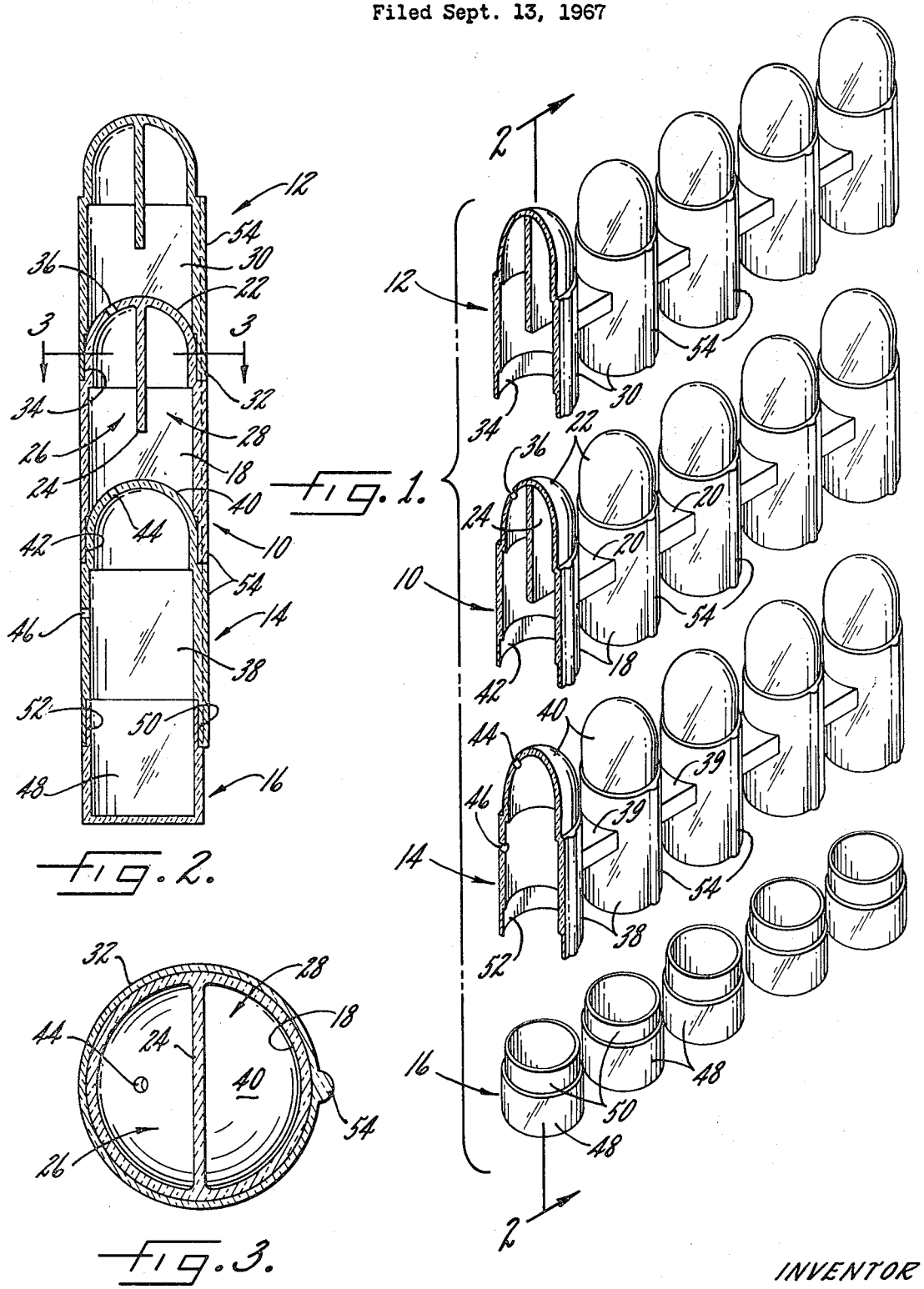

3,553,082
METHOD AND MEANS FOR DETECTING COLIFORM BACTERIA IN WATER
Clifford C. Hach, Ames, Iowa, assignor to Hach Chemical Company, Ames, Iowa, a corporation of Iowa
Filed Sept. 13, 1967, Ser. No. 667,578
Int. Cl. C12k *1/00;* G01n *33/18*
U.S. Cl. 195—127
10 Claims

ABSTRACT OF THE DISCLOSURE

A method and means for determining the presence or absence of specific bacteria such as coliform bacteria in a test sample by contacting a first nutrient medium such as a lactose broth in a first environment with a liquid sample, maintaining a second nutrient medium such as a brilliant green lactose bile broth solution in a second environment in contact with the test sample and the first nutrient medium so that a predetermined rate of transfer takes place and observing the environments to determine whether any physical or chemical change takes place, characteristic of the bacteria under determination, such as gas formation.

---

This invention relates to the testing of water or other liquids and, more particularly, to a method and means for determining whether the water or other liquid is potable by detecting the presence or absence of either pathogenic or indicator types such as coliform bacteria.

The most widely used technique in determining whether water is of drinkable quality is testing for the presence of coliform bacteria. These bacteria are found in the intestines of animals, humans and in the soil. If present in water they are the result of pollution by sewage or surface water. If a test shows coliform bacteria to be present in a water supply, it is to be concluded that the water has been contaminated in some way and that this contamination may be accomplished by pathogenic or disease producing organisms.

One method of determining the presence of coliform bacteria in a water sample is by a biochemical fermentation technique. In the presence of certain inoculant media the coliform bacteria in the water sample will ferment over a period of time and liberate a variety of gases consisting primarily of carbon dioxide and hydrogen gases. The observation of gas formation is a positive indication that these organisms are present in the sample. To accurately carry out this test two different media are used. One encourages rapid multiplication of the coliform bacteria while the other is directed to selection and distinguishing the coliform group from other bacteria.

The U.S. Public Health Service Drinking Water Standards, for the fermentation technique, requires that five ten milliliter samples (or larger) of the source being tested be used. Each sample portion is placed in a culture vessel provided with an inverted fermentation vial (normally a Durham tube). The lactose medium in each fermentation tube is thus inoculated with the sample and is incubated at 35° C. (plus or minus 0.5° C.) for at least 24 hours and/or 48 hours. Each tube is examined at the end of 24 hours (plus or minus two hours) to determine whether any gases are present in the inverted vial. If no gas is detected, the tubes are again examined at the end of 48 hours (plus or minus three hours) from the original inoculation. This is termed the Presumptive test and is directed to the rapid multiplication of any coliform bacteria that may be present.

To carry out the selective aspect the Confirmed test is used. This is carried out on all fermentation tubes from the Presumptive test that exhibited any amount of gas formation at either the 24 hour or 48 hour observation. Small portions of the culture in these tubes are transferred to similar fermentation tubes containing brilliant green lactose bile broth. The amount transferred is one loopful in diameter. These tubes are then incubated for a period of a 24 gauge wire loop of not less than three millimeters of 48 plus or minus three hours at 35° C. (plus or minus 0.5° C.). The formation of gas in any amount after this period constitutes a positive Confirmed test and the number of positive tubes out of the total inoculated by the sample provides a "most probable number" of the quantity of organisms present.

This procedure, while accurate, must generally be carried out in a laboratory because of the type of apparatus required and by trained scientists because of the need for careful aseptic techniques in the handling of the samples and media. And, the time that elapses between the taking of the sample and the time when the test is commenced may have a detrimental effect on the accuracy. Coliform organisms may proliferate to such an extent subsequent to sample collection and prior to analysis that unduly high bacterial counts are obtained. While refrigeration can minimize this problem to some extent, refrigeration at too rapid a rate can kill a large percentage of the coliform organisms and very low numbers would erroneously be indicated in later analyses.

It is a general aim of the present invention to provide a method and means for determining the presence or absence of coliform bacteria in field situations which are carried out in conformity with the standarized laboratory procedures known as the Presumptive and Confirmed tests. A related object is to provide such a method that can be carried out by individuals not necessarily trained in the techniques of the laboratory procedure.

A second aspect provides for the collection of the sample directly into the final test apparatus, without necessity to measure or transfer the sample at a later time.

Another aspect of this invention is the provision of a method and means for determining the presence of coliform bacteria in a minimum amount of time.

A still further aspect of this invention allows the use of simple, inexpensive apparatus for carrying out the above-described determinations.

A more specific object of this invention is the provision of a method and means for automatically controlling the inoculation of the test sample into the Confirmed test medium.

Other objects and advantages of the invention will become apparent as the following description proceeds, taken in conjunction with the accompanying drawings in which:

FIG. 1 is an exploded perspective view partly in cross-section of an exemplary embodiment that can be used to determine the presence or absence of coliform bacteria in accordance with the novel method of this invention;

FIG. 2 is a cross-sectional view taken substantially along the lines 2—2 of FIG. 1, except that the embodiment is assembled, and FIG. 3 is a cross-sectional view taken substantially along the lines 3—3 of FIG. 2.

While the invention is susceptible of various modifications and alternative forms, the specific embodiments thereof have been shown by way of example in the drawing and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims. For example, while the exemplary embodiment is directed to determining the presence or absence of coliform bacteria in water it should be appreciated that the novel method and means described herein is fully applicable to use with other nutrient mediums to determine the presence or absence of other specific bacteria in water or other liquids.

In accordance with the present invention the presence of coliform bacteria in a water sample is determined by contacting a lactose broth in a first environment with the test water sample, maintaining a brilliant green lactose bile broth solution in a second environment in contact with the test water sample and lactose broth so that a predetermined rate of transfer takes place and observing the environments to determine whether any gas is produced by fermentation.

To carry out the novel method of this invention there is provided a device which includes a first chamber to receive the test water or other liquid sample and the first nutrient medium such as lactose broth for the Presumptive test. A partition is positioned within the first chamber to divide the first chamber into two sections and to serve as a collector of any gas developed from the fermentation of any coliform bacteria that are present. A second chamber receives a second nutrient medium such as a brilliant green lactose bile broth solution to carry out the Confirmed test. The two chambers are connected by an orifice of a predetermined size so that the brilliant green lactose bile broth solution contained in the second chamber is maintained in contact with the test water sample and lactose broth in the first chamber with transfer thereby taking place. The second chamber is also provided with a partition to divide the second chamber into two sections and to serve as a collector of any gas developed from the fermentation of the coliform bacteria in the portion of the test water sample that has entered the second chamber.

A reservoir connected to the first chamber means by a small orifice (is or may be) provided to collect any liquid expelled from the two chambers by the gas formation. A vent orifice to the atmosphere is also provided in the reservoir to avoid any pressure build up that could result from any gas formation.

To insure that any gas developed in carrying out the Presumptive test in the first chamber does not somehow find its way into the gas collection portion of the second chamber it is preferred to locate the orifice connecting the two chambers in the first chamber in the section that is not being employed for gas collection. It is also preferred to position the orifice connecting the two chambers so that any air bubbles that are in the first chamber will not block the orifice and prevent transfer, as will be later developed.

Turning now to the drawings there is illustrated one embodiment of the apparatus for carrying out the method of this invention. This embodiment comprises four sections, the Presumptive section 10, the Confirmed section 12, the Reservoir section 14 and the Closure section 16. To use the standard laboratory test the unit illustrated can carry out a five portion test simultaneously.

The water test sample is subdivided into five portions, which are each contained in respective ones of the first chambers 18 which comprise the Presumptive section 10 in which the lactose broth is placed. The chambers 18 are connected by means of connecting webs 20 so as to unitize the apparatus for easy handling. The first chambers terminate in dome-shaped portions 22. Typically, the first chambers will have a capacity of ten milliliters to meet the recommended standards for the coliform determination. To collect the gas that forms in the first chambers when any coliform bacteria present in the water sample ferment in contact with the lactose broth used as the enrichment media there is provided a first separator or divider 24. This separator or divider is conveniently molded in place during manufacture and provides two sections 26, 28, one of which may be freed from extraneous air and used as a gas collector. The removal of air insures that the presence of any gas following the test is from the fermentation of the water sample.

To hold the confirming medium solution the Confirmation section 12 includes five second chambers 30. These are identical to the first chambers 18 except for the absence of the orifices as will be developed hereinafter. The bottom portions 32 of the second chambers terminate in skirt portions 34 which are adapted to snugly fit on the outside of the dome-shaped portions 22 of the first chambers 18. The fit should be sufficiently snug so that the second chambers 30 are effectively hermetically sealed.

In accordance with one feature of this invention the confirming medium solutions contained in the second chambers 30 are maintained in contact with the test water samples and the lactose broths contained in the first chambers 18 by orifices 36. These orifices are formed in the illustrative embodiment in the top portions 22 of the first chambers 18. Preferably the orifices 36 are positioned below the highest point of the dome-shaped portions 22, with a distance of about ¼ inch being suitable. This insures that any air bubbles remaining after the unit has been filled will not block the orifices and prevent transfer.

The size of the orifice 36 must be such that the number of coliform cells in the solution of the test water sample and lactose broth that transfers into the second chambers approximate the number that would be transferred by using the standard laboratory method. If the transferred portion is too small, the inhibitory effect of the brilliant green lactose bile broth solution, even though slight for coliform organisms, might retard growth and thus prevent an otherwise positive determination. On the other hand, an excessive transfer could overcome the inhibitory effect of the medium to yield a false positive result. Stated another way, the size and position of the orifice is such as to permit transfer of an effective amount of the test liquid sample and the lactose broth (i.e., the amount required by the laboratory method being simulated) before the formation of a gas bridge preventing any further transfer.

Under the 35° C. incubation condition, an orifice size of about 340 microns has been found to be suitable. This permits transfer of about 0.001 milliliter per hour of the solution in the first chamber 18 into the second chamber 30 and the number of coliform cells transferred approximates the number that would be transferred in the standard laboratory method.

Serving as a receptacle for any liquids that are forced out of either of the chambers 18 and 30 by the formation of gas are reservoirs 38 which are connected by supports 39 and provided with dome-shaped portions 40 which fit snugly inside the skirt portions 42 of the first chambers 18 so as to be virtually airtight. The portions 40 contain orifices 44 that allow any liquid forced out of either the first chambers 18 or the second chambers 30 to pass into the reservoirs 38. Vent orifices 46 are provided to connect the interiors of the reservoir means 38 to the atmosphere so that the build up of pressure from the gas formation during fermentation will be minimized.

Rather than forming the reservoir means 38 with its own closure, the illustrated embodiment utilizes a separable Closure section 16. The tops of the Closure section chambers 48 terminate in portions 50 of a reduced diameter which snugly fit inside the skirt portions 52 of the reservoirs 38. The Closure section chambers 48 provide additional capacity for the collection of liquids that are displaced from either the first or second chambers 18 and 30, respectively, by the formation of gas in those chambers.

To insure that the unit is assembled in the correct manner so the vials and orifices are in proper position positioning lines or keys 54 are formed on the outside of the Confirmed, Presumptive and Reservoir sections.

It is preferred to mold the entire unit by conventional injection molding techniques from a clear plastic such as polystyrene. However, any non-toxic (biologically inert), non-biodegradable clear or translucent material could be used. Optical clarity in the material is of course preferred because of the ease in viewing the contents of the several chambers. Any type of manufacturing method can be used but injection molding provides the close tolerances that must be had to make the first and second chambers when filled with the media and test water samples hermetically sealed. If these were not sealed from the air, the required transference would be seriously impaired. Injection molding also allows inexpensive manufacturing so the unit if made from plastics can be disposed of after one use rather than being re-sterilized.

While the exemplary embodiment illustrates the various sections one atop the other, it should be appreciated that the sections could also be alongside each other. In this arrangement, from right to left, would be positioned the Confirmed section, the Presumptive section and the Reservoir section.

One suitable means for carrying out the determination for the presence of coliform bacteria using the illustrative embodiment of the apparatus of this invention will be hereinafter described. Before use, the unit should of course be sterilized. The Confirmed section 12 is first separated from the remainder of the unit, inverted and then each of the second chambers 30 are completely filled with a sterile brilliant green lactose bile broth solution. If desired, a sterile dehydrated medium which can be reconstituted by adding sterile water to achieve the proper solution concentration could be used. The unit is then reassembled and the Confirmed section 12 and Presumptive section 10 (kept assembled) are separated from the remainder of the unit and maintained in an inverted position while the first chambers 18 are filled with lactose broth and the test water samples. A sterile dehydrated medium could also be used here. These sections are reassembled with the rest of the unit.

Before placing the assembled device into a controlled environment at 35° C. (plus or minus 0.5° C.) for incubation it is necessary to isolate any entrapped air bubbles that may appear in the chambers 26, 28. To do this, the filled and assembled unit is first inverted, then slowly rotated in such a manner that the air bubbles are allowed to collect in the chambers 26, which are opposite the positioning lines 54. This places any extraneous air away from the chambers 28 that are to be used for viewing the results of the test, thereby insuring that any gas bubbles observed in chambers 28 are due to the coliform fermentation. As can be seen from FIG. 2, this can be accomplished because the division by the separators for the first and second chambers is only partial. This would normally be done by rotating the inverted assembled unit such that the direction of rotation of the reservoir chamber is away from the one performing the rotation.

The transfer caused by the contact between the brilliant green lactose bile broth solutions contained in the second chambers 30 and the test water samples and the lactose broths contained in the first chambers 18 being in contact with the orifices 36 begins immediately. This transfer continues until the gases formed in the first chambers 18 are of sufficient volumes to form gas bridges between the two solutions. In contrast to the 96 hours that may be required by the standard laboratory method the apparatus of this invention has been found to require but a maximum total observation period of about 54 to 60 hours because of the early incubation that is allowed.

While the exemplary embodiment employed utilizes only one Presumptive section 10 and one Confirmed section 12, it should be appreciated that the apparatus of this invention could employ a plurality of these sections if a particular test necessitated that additional refinements beyond Confirmation be made. Similarly, while the exemplary embodiment includes a Reservoir section that is part of the unit, this is not an essential aspect of the present invention. The apparatus of this invention could be designed to provide the first chamber in the Presumptive section with a vent to the atmosphere that would prevent undue pressure build up by allowing the liquid displaced by gas formation to overflow. The overflow could be trapped, if desired, by a receptacle such as a pan or dish.

Thus, the novel method of this invention provides a means for carrying out the test for the detection of coliform bacteria in water which is equivalent to the Presumptive and Confirmed tests required by the U.S. Public Health Service Drinking Water Standards. Moreover, because the test water sample begins transferring into the media used for the Confirmed test immediately, the presence of any coliform bacteria can be confirmed in a period of time of as early as 24 hours and no more than about 54 to 60 hours as compared with the 96 hours that was heretofore required. The novel device used allows the transfer to be discontinued automatically and this, in combination with the size of the orifice, provides a means for insuring that the number of coliform cells that are transferred are equivalent to the number transferred in the standard laboratory technique. The unit can also readily utilize dehydrated media for the tests since the unit can be easily inverted to eliminate the possible interference of entrapped air bubbles, a feature that cannot be accomplished by some types of laboratory apparatus.

I claim as my invention:

1. An apparatus for detecting the presence of specific bacteria in a liquid test sample which comprises a first chamber to receive the test liquid sample and a first nutrient medium, a separator positioned within said first chamber to divide said first chamber into two sections which may serve as collectors for any gas developed from the fermentation initiated by the specific bacteria, a second chamber positioned above said first chamber to receive a second nutrient medium, an orifice, the size and position thereof being such as to permit transfer of an effective amount of said test liquid sample and said first nutrient medium into said second chamber before the formation of a gas bridge preventing any further transfer, said second chamber including a separator positioned within said second chamber to divide it into two sections which may serve as collectors for any gas developed from the fermentation initiated by the specific bacteria in the test liquid sample and first nutrient medium that has entered said second chamber, the division by said separators for said first and second chambers being partial so that gas in one section may be transferred to the other section, and a reservoir having its interior connected to said first chamber to collect any liquid expelled from said two chambers by gas formation, said reservoir having a vent connecting its interior to the atmosphere.

2. The apparatus of claim 1 wherein said reservoir has an open end and a closure is positioned adjacent the open end of said reservoir.

3. The apparatus of claim 1 wherein said first chamber has a volume of ten milliliters and the means connecting said first chamber with said second chamber is an orifice of about 340 microns.

4. The apparatus of claim 3 wherein the apparatus is made of polystyrene.

5. The apparatus of claim 1 wherein at least said first and second chambers include positioning means to insure that said chambers are assembled in a predetermined manner.

6. A unit for detecting the presence of coliform bacteria in water which comprises a presumptive section including a plurality of first chambers all connected together side by side, each receiving a test water sample and lactose broth, aid first chambers each having a separator positioned dividing said first chambers into two sections which may serve as collectors for any gas developed from the fermentation of any coliform bacteria present in the test water sample, a confirmed section including a plurality of second chambers identical in number to said first chambers and all connected together side by side, each adapted to receive a brilliant green lactose bile broth solution, said presumptive section being positioned below said confirmed section, an orifice, the size and position thereof being such as to permit transfer of an effective amount of said water test sample and said lactose broth into said second chamber before the formation of a gas bridge preventing any further transfer, each of said second chambers having a separator dividing said first chambers into two sections which may serve as collectors for any gas developed from the fermentation of the coliform bacteria in the test water sample that has entered said second chambers, the division by said separators for said first and second chambers being partial so that gas in one section may be transferred to the other section, and a reservoir section including a plurality of reservoirs equal in number to said first chambers and all connected together, each having its interior connected to a selected one of said first chambers to collect any liquid expelled from said first and second chambers by gas formation and a vent orifice connecting the interior of each of said reservoirs to the atmosphere to avoid any pressure build up resulting from the gas formation.

7. The unit of claim 6 wherein there are five first chamber means each having a capacity of ten milliliters.

8. The unit of claim 7 wherein the means maintaining the brilliant green lactose bile broth solution contained in each of said second chambers in contact with the test water sample and lactose broth contained in said first chambers is an orifice of about 340 microns.

9. The unit of claim 5 wherein at least one of said first and second chambers include positioning means to insure that said sections are assembled in a predetermined manner.

10. An apparatus for detecting the presence of specific bacteria in a liquid test sample which comprises a first chamber to receive the test liquid sample and a first nutrient medium, a separator positioned within said first chamber to divide said first chamber into two sections which may serve as collectors for any gas developed from the fermentation initiated by the specific bacteria, a second chamber positioned above said first chamber to receive a second nturient medium, an orifice, the size and position thereof being such as to permit transfer of an effective amount of said test liquid sample and said first nutrient medium into said second chamber before the formation of a gas bridge preventing any further transfer, said second chamber including a separator positioned within said second chamber to divide it into two sections which may serve as collectors for any gas developed from the fermentation initiated by the specific bacteria in the test liquid sample and first nutrient medium that has entered said second chamber, said first chamber having a vent connecting its interior to the atmosphere to prevent pressure build up by the gas formation and to provide an exit for any liquid displaced from said two chambers by the gas formation, the division by said separators for said first and second chambers being partial so that gas in one section may be transferred to the other section.

References Cited
UNITED STATES PATENTS

| | | | |
|---|---|---|---|
| 3,102,082 | 8/1963 | Brewer | 195—139 |
| 3,205,151 | 9/1965 | Landau et al. | 195—103.5 |

ALVIN E. TANENHOLTZ, Primary Examiner

M. D. HENSLEY, Assistant Examiner

U.S. Cl. X.R.

195—103.5, 139